Figure 1:
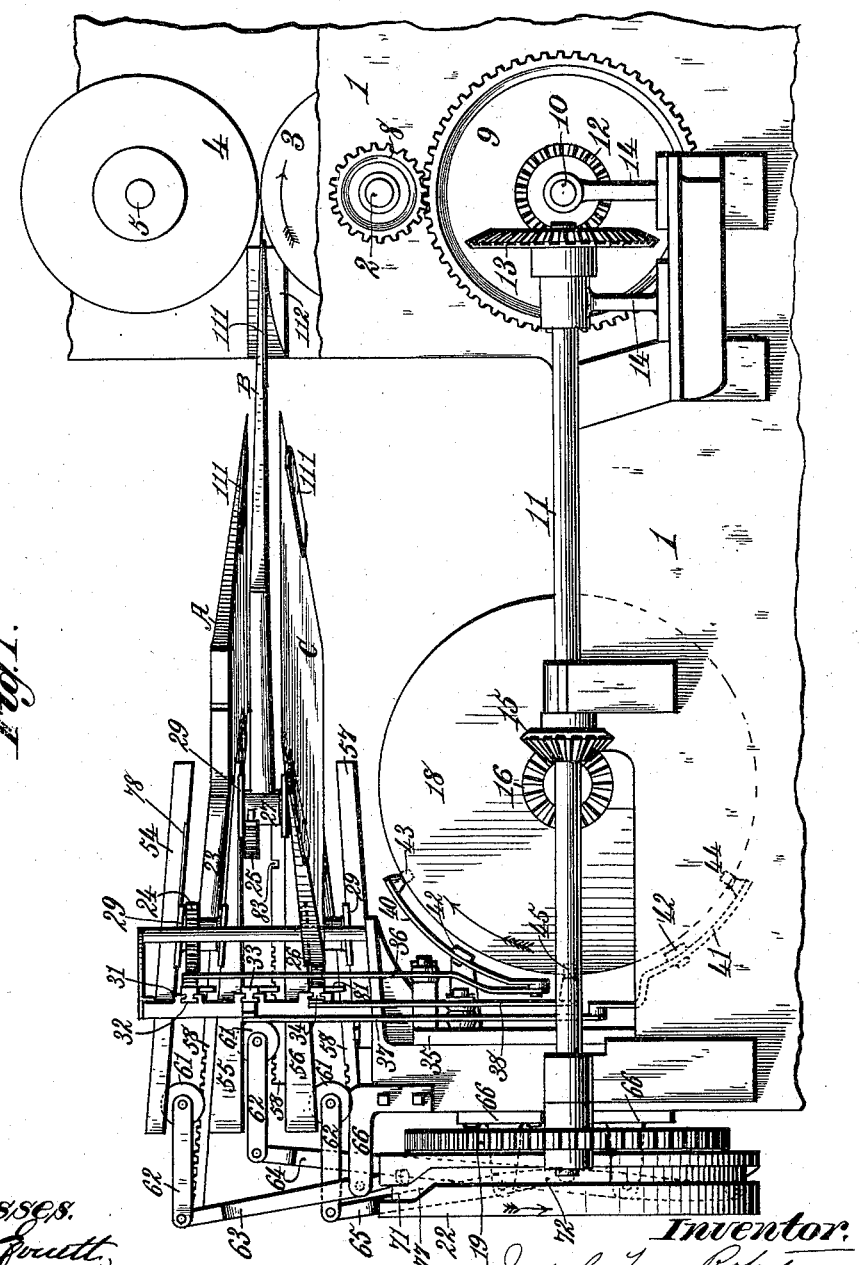

(No Model.) 7 Sheets—Sheet 1.

J. T. ROBERTSON.
FEEDER FOR PRINTING PRESSES.

No. 590,115. Patented Sept. 14, 1897.

Witnesses.
Robert Crouett
Percy B. Hills

Inventor.
Judah Touro Robertson
By Franck D. Johns
Atty (No Model.)
7 Sheets—Sheet 2.
J. T. ROBERTSON.
FEEDER FOR PRINTING PRESSES.
No. 590,115.
Patented Sept. 14, 1897.
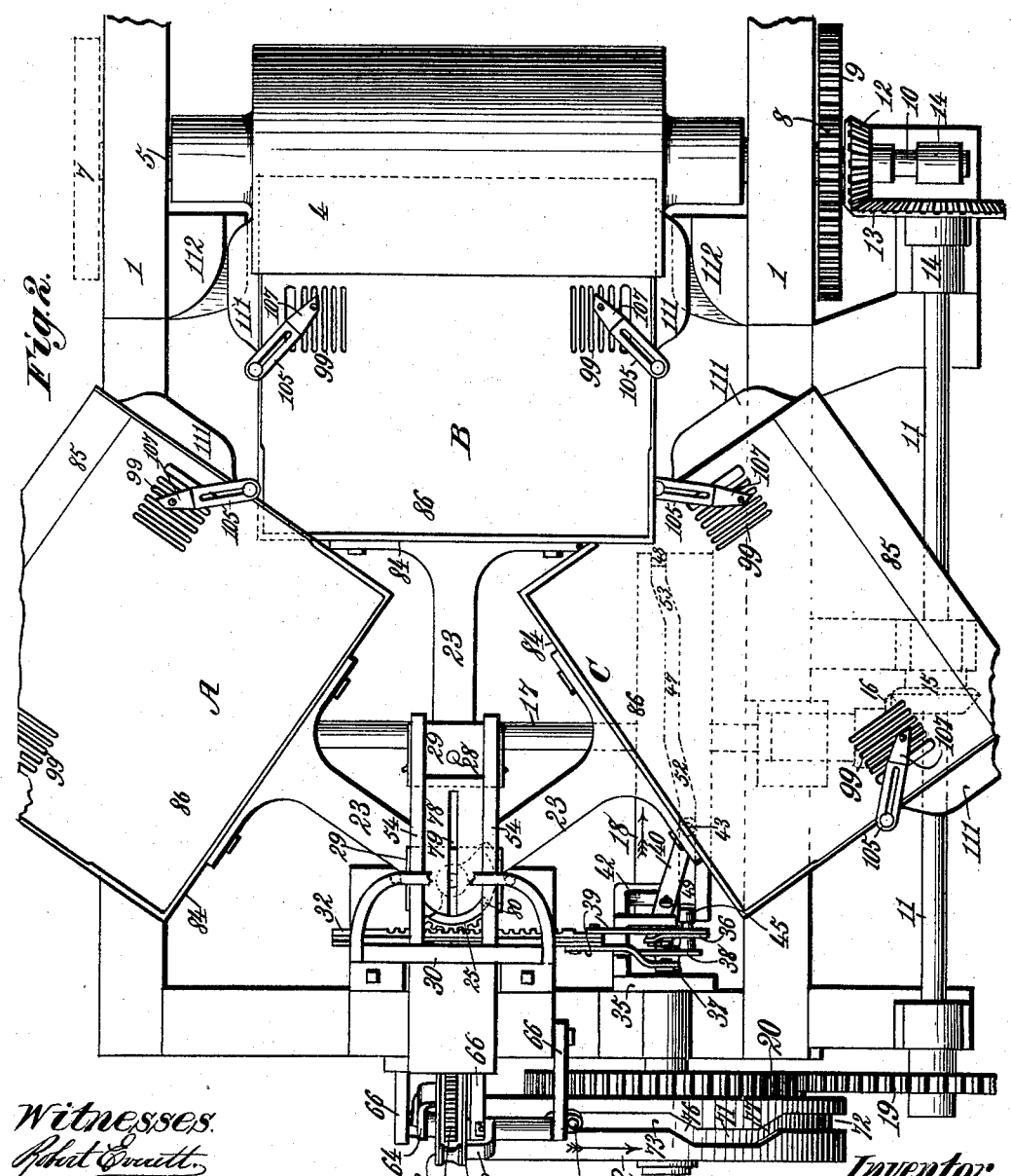
Witnesses
Robt Everitt
Percy B. Hills
Inventor:
Judah Tons Robertson
By Franck D. Johns
atty

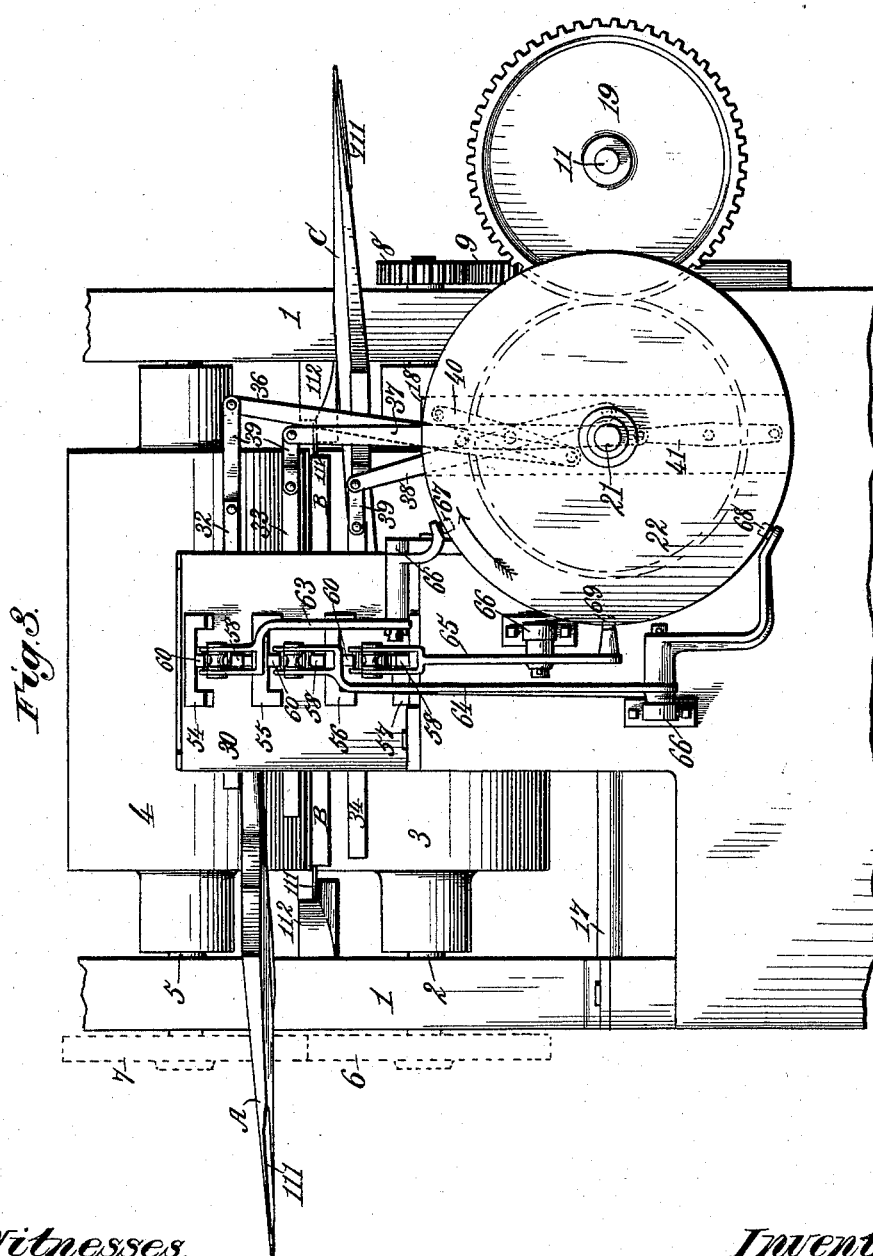

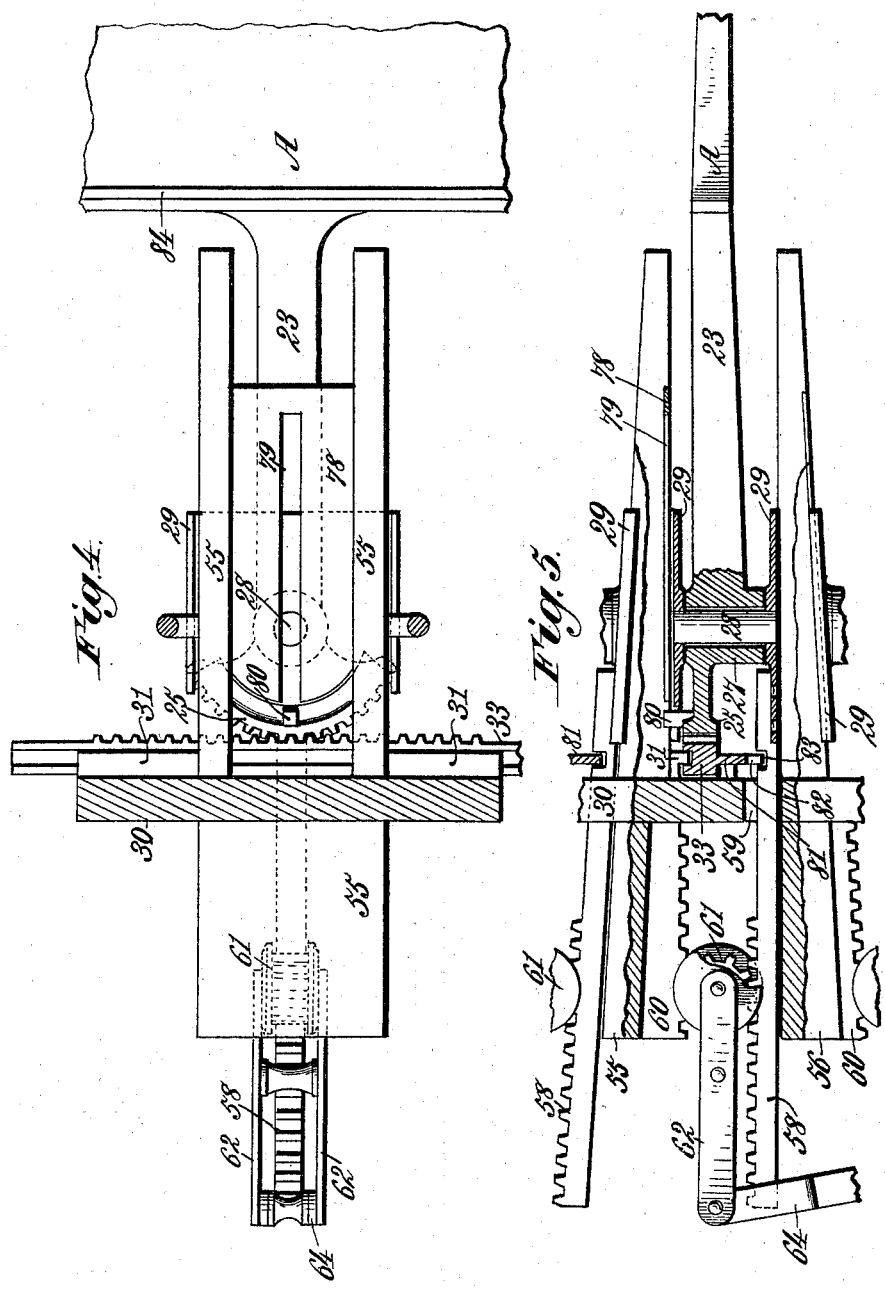

(No Model.) 7 Sheets—Sheet 5.
J. T. ROBERTSON.
FEEDER FOR PRINTING PRESSES.
No. 590,115. Patented Sept. 14, 1897.
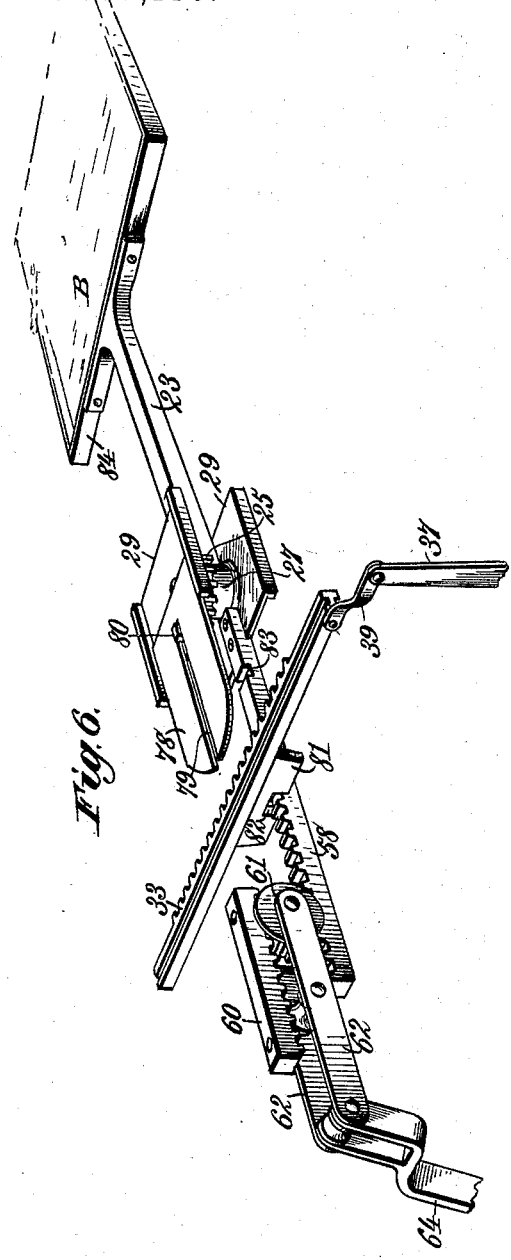
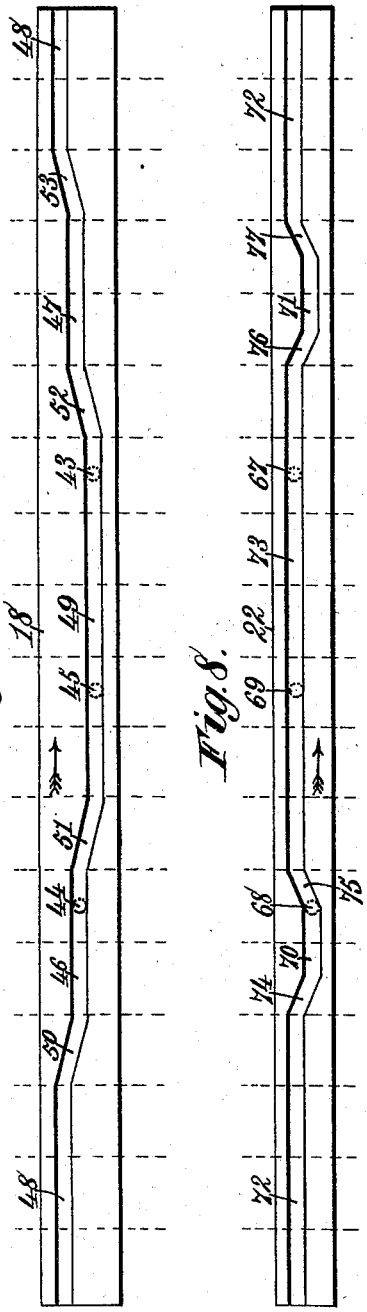
Witnesses.
Robt Ewatt.
Percy B Hills
Inventor.
Judah Touro Robertson
By Franck D. Johns
Atty (No Model.) 7 Sheets—Sheet 6.
J. T. ROBERTSON.
FEEDER FOR PRINTING PRESSES.
No. 590,115. Patented Sept. 14, 1897.
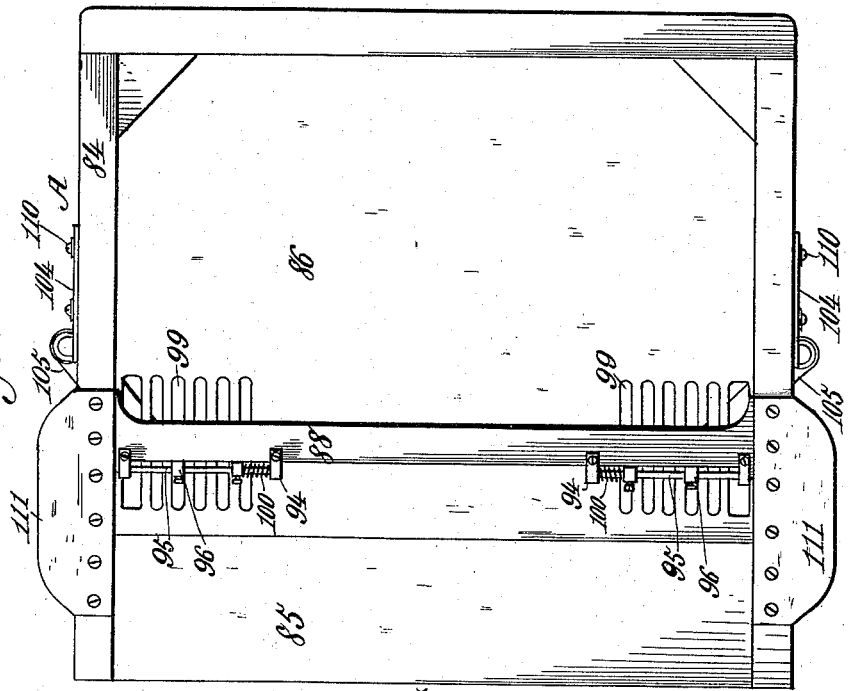
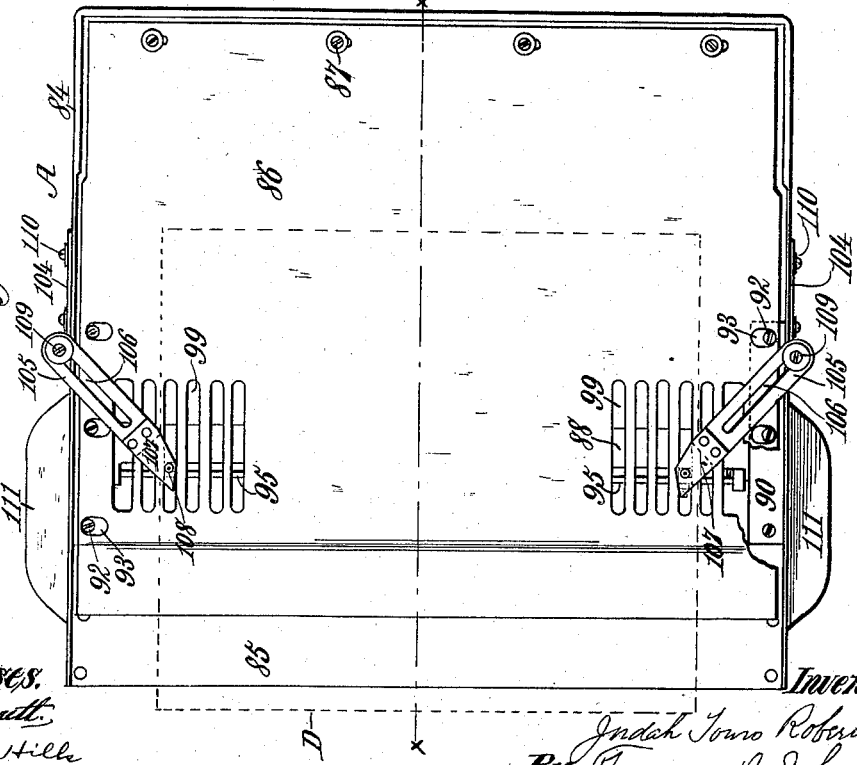

(No Model.) 7 Sheets—Sheet 7.
J. T. ROBERTSON.
FEEDER FOR PRINTING PRESSES.
No. 590,115. Patented Sept. 14, 1897.
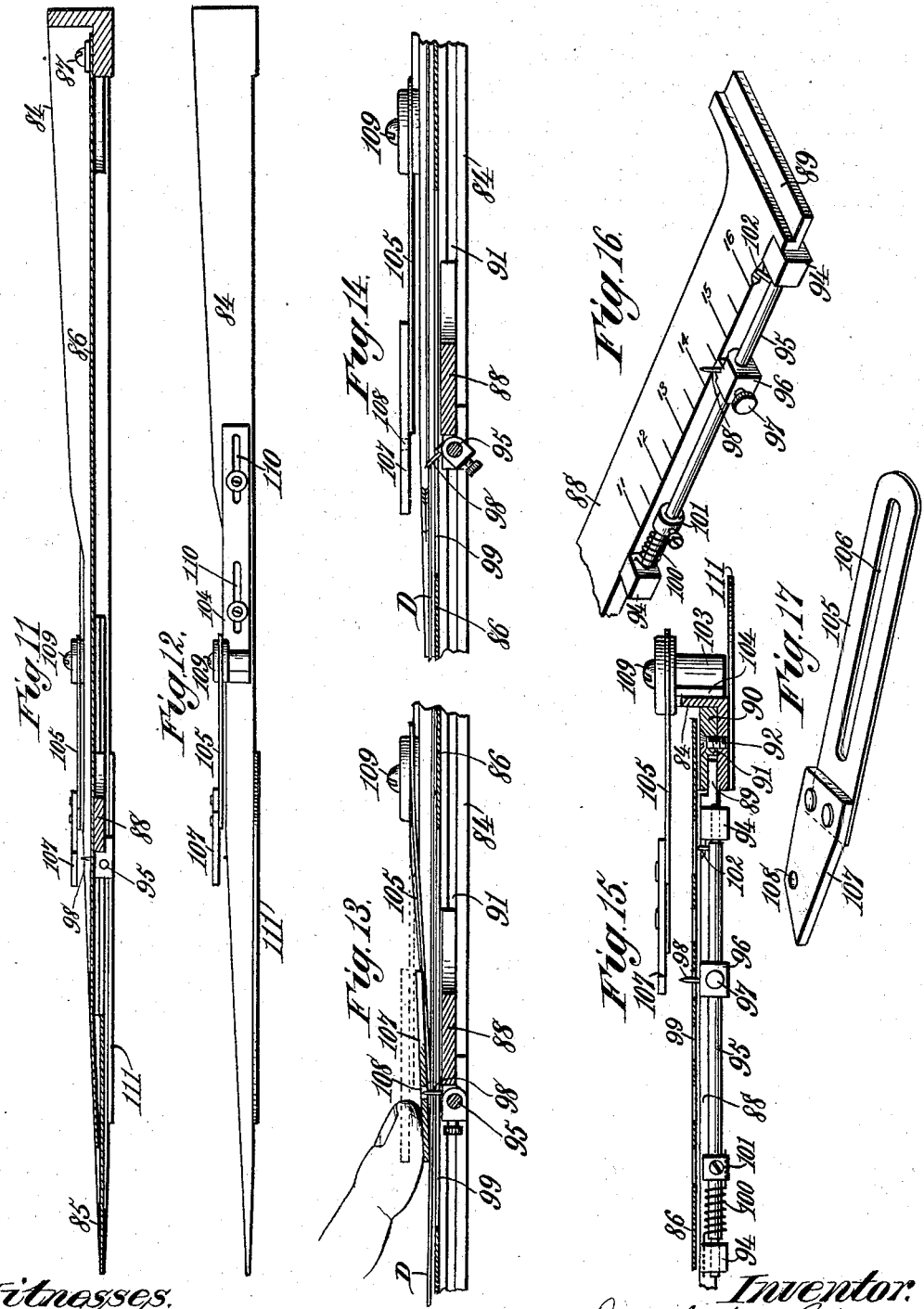
Witnesses.
Robert Everett
Percy B. Hills
Inventor:
Judah Tino Robertson
By Franck D. Johns
Atty.

UNITED STATES PATENT OFFICE.

JUDAH TOURO ROBERTSON, OF NEW YORK, N. Y.

FEEDER FOR PRINTING-PRESSES.

SPECIFICATION forming part of Letters Patent No. 590,115, dated September 14, 1897.

Application filed May 2, 1896. Serial No. 589,987. (No model.)

*To all whom it may concern:*

Be it known that I, JUDAH TOURO ROBERTSON, a citizen of the United States, residing at New York, in the county of New York and State of New York, have invented certain new and useful Improvements in Feeders for Printing-Presses; and I do hereby declare the following to be a full, clear, and exact description of the invention, such as will enable others skilled in the art to which it appertains to make and use the same.

My invention relates to improvements in feeders for printing-presses and analogous devices adapted to be run at a high rate of speed, and is intended more particularly as an improvement on the construction disclosed in application filed by me December 23, 1895, Serial No. 573,065. In the said application is disclosed a series of independently-movable feeder-boards adapted to travel transversely across the path of the delivery-line of feed to the press, it being necessary that the housing supporting the plate and impression rollers should be cut away or recessed to permit of this transverse movement. This cutting away of the housing has been found in some instances to materially weaken the structure and has been found to be inexpedient, particularly in certain classes of plate-printing presses, and it is to do away with the necessity for this cutting or recessing of said housing that my present improvement is designed.

To this end my invention consists, primarily, in a series of independently-movable feeders adapted not only to travel transversely across the path of the delivery-line of feed to the press, but also to receive an independent forward movement into delivery position and to be withdrawn therefrom immediately after delivery, each feeder adapted, as in my application above referred to, to remain at rest in position to receive its sheet ready for delivery during the entire period consumed by the other feeders of the series in delivering their sheets successively to the press.

A further object of my invention is to provide an improved construction of feeder-board upon which the paper to be printed may be laid and accurately adjusted and registered to its proper position in a brief period of time, means being provided for detachably retaining the sheet in its registered position during the movement of the feeder-board from the laying-on to the delivery position.

As in my application above referred to, I have omitted as far as practicable all details of construction of the press—such, for instance, as parts of the frame or housing, the inking, wiping, and polishing devices, and all gearing not essential to illustrate the operation of the present invention.

Referring to the drawings accompanying this specification, Figure 1 represents a side elevation of a portion of a rotary plate-printing press provided with my invention. Fig. 2 is a top plan view of the same. Fig. 3 is an end view of the same. Fig. 4 is a detail horizontal sectional view taken through the framework supporting the feeder-boards. Fig. 5 is a detail view, partly in vertical section, showing the support and part of the operating mechanism for one of the feeder-boards. Fig. 6 is a detail perspective view of one of the feeder-boards and part of its supporting and operating mechanism. Figs. 7 and 8 are diagrammatic views of the cam-wheels for controlling the movements of the feeder-boards. Fig. 9 is a detail top plan view of one of the feeder-boards embodying my improved registering mechanism. Fig. 10 is a detail bottom plan view of the same. Fig. 11 is a detail longitudinal sectional view of one of the feeder-boards, taken on the line $x\,x$, Fig. 9. Fig. 12 is a detail side elevation of one of said feeder-boards. Figs. 13, 14, 15, 16, and 17 are detail views illustrating various parts of my said improved registering mechanism for the feeder-boards.

Referring to the said drawings, the reference-numeral 1 denotes the frame or housing supporting the various parts of my improved mechanism. Mounted in said frame is a shaft 2, carrying the plate-cylinder 3, the latter adapted to receive a plate fastened thereto in any well-known manner. Mounted in the frame directly above said plate-cylinder is an impression-cylinder 4. The shaft 5 of this cylinder is geared to the shaft 2 of the plate-cylinder by the gear-wheels 6 and 7, (shown in dotted lines in Fig. 3,) said gear-wheels being of the same diameter, so that the plate and impression cylinders will rotate at the same speed.

Motion from any suitable source of power may be imparted to either of the shafts 2 or 5, it not being deemed necessary to illustrate this feature.

Mounted on the other end of the shaft 2 is a gear-wheel 8, meshing with a larger gear-wheel 9, mounted on a shaft 10, the relative sizes of these gear-wheels being such that gear-wheel 8 will rotate three times to one rotation of gear-wheel 9.

Running longitudinally of the frame of the machine and at a right angle to shaft 10 is the shaft 11, the former having a bevel gear-wheel 12 meshing with a larger bevel gear-wheel 13 on the latter shaft, the relative proportions of said bevel gear-wheels being such that shaft 11 will be rotated once to two rotations of shaft 10. Shaft 11 and the end of shaft 10 are supported by suitable brackets 14, mounted on the frame 1 of the machine. Intermediate its length shaft 11 has mounted thereon a miter-gear 15, meshing with miter-gear 16, mounted on one end of a transverse shaft 17, supported by the frame of the machine. This shaft 17 also carries a cam-wheel 18, adapted to impart a vibrating motion to the feeder-boards of the press in a manner hereinafter described. On the end of shaft 11 opposite to bevel-gear 13 is mounted a gear-wheel 19, meshing in turn with gear-wheel 20, mounted on a shaft 21, carried by the frame of the machine and also having mounted thereon a cam-wheel 22, adapted to impart a reciprocating movement to the feeder-boards of the press in a manner hereinafter described.

The mechanism for imparting the vibrating motion to the feeder-boards is substantially the same as that shown in my application, Serial No. 573,065, hereinbefore referred to, and in a press provided with a series of three feeder-boards consists of the following elements: The three feeder-boards A, B, and C are mounted one above another and are carried by suitable rigid arms 23, which are formed at their rear ends into toothed segments 24, 25, and 26. Each of these arms 23, at a distance a little in front of said toothed segments, has formed thereon a hub 27, through which passes a bearing 28, mounted at its ends in sliding plates 29, hereinafter described. It will thus be seen that the arms 23 are adapted to be vibrated upon said bearings 28 as pivots, it being understood that the toothed segments 24, 25, and 26 are formed upon an arc of a circle taken from the center of said bearings.

The transverse framework 30 of the machine is provided with a series of three horizontal ways 31, adapted to support therein the horizontal racks 32, 33, and 34, having their teeth meshing, respectively, with the toothed segments 24, 25, and 26 when the latter are in their rearmost positions, as hereinafter described.

Pivoted intermediate their lengths in suitable brackets 35, attached to the frame of the machine and on the same side thereof as the cam-wheel 18, are three levers 36, 37, and 38. The upper ends of these levers are connected by means of intermediate links 39 to the ends of said racks, lever 36 being connected to rack 32, lever 37 to rack 33, and lever 38 to rack 34. The lower ends of the levers 36 and 37 are pivotally engaged with levers 40 and 41, the latter being pivoted intermediate their lengths to suitable brackets 42, attached to the main frame of the machine, lever 36 being connected to lever 40 and lever 37 to lever 41. The free ends of these levers 40 and 41 are provided with stud-rollers 43 and 44, respectively, adapted to remain at all times in a continuous cam-groove in the periphery of cam-wheel 18. The lever 38 has no second lever, but is connected directly with said cam-groove by its stud-roller 45. Referring to said cam-groove, (shown in diagram in Fig. 7, in which the arrow indicates the direction of rotation,) it will be seen that the same consists of two short central straight races 46 and 47, and two long straight races 48 and 49, both of them parallel with the races 46 and 47, the race 48 lying to one side and race 49 to the other side of said races 46 and 47. These races are connected one to the other by diagonal steps 50, 51, 52, and 53, as shown. The relative lengths of these races and steps are preferably as follows, the circumference of the cam-wheel being divided into eighteen equal divisions: the long races 48 and 49 five-eighteenths each, the short races 46 and 47 two-eighteenths each, and the diagonal steps 50, 51, 52, and 53 one-eighteenth each, as clearly shown in Fig. 7. The relative positions of the stud-rollers are shown in said Fig. 7, they being equidistant from each other and disposed around one-third the circumference of said cam-wheel, and from said figure and the above description it will be understood that two of said stud-rollers always enter and leave two of the diagonal steps at the same time. Now by inspecting Fig. 3 it will be seen that all the feeder-boards to be in the central position must have their stud-rollers either in race 46 or 47, which is the position occupied by the feeder-board B in said figure, its stud-roller 44 being in race 46. By reason of the compound-lever construction connected with feeder-boards A and B it will be seen that for either one of these boards to be to the right of the central position it is necessary that its respective stud-roller 43 or 44 should move in race 48, while for them to be to the left of the central position their stud-rollers must move in race 49. On the contrary, feeder-board C by reason of its having no compound lever but merely the simple lever 38, will be to the right of the central position when its stud-roller 45 is in race 49 and to the left when in race 48. Now feeder-board B being in the central position, feeder-board A being to the left, and feeder-board C to the right, the stud-rollers will be in the position shown in Fig. 7; but as the cam-wheel 18 rotates in the direction of the arrow, Fig. 7, stud-roller 44 will approach and enter diagonal step 50 and at the same time stud-roller 45 will enter diagonal step 51, while stud-roller 43 will remain in race 49. The result of this is that feeder-board A, controlled by stud-roller 43, will remain at rest to the left of the central position, while feeder-board B, controlled by stud-roller 44, will move from the central position to the right, and feeder-board C, controlled by stud-roller 45, will move from its position to the right to the central position. The next step is that stud-roller 43 reaches diagonal step 51, thus moving feeder-board A into the central position, while stud-roller 45, reaching diagonal step 50, moves its feeder-board C to the left of the central position, leaving feeder-board B at rest to the right of the central position, its stud-roller 44 remaining in race 48. This operation is continued indefinitely, it being apparent that each feeder-board in turn remains at rest alternately to one side and to the other until the other two feeder-boards have moved to and away from the central position.

Referring now to the mechanism for imparting a longitudinal reciprocating movement to each feeder-board while it is in the central position, so that the feeder-boards will be successively carried forward to the proper delivery position with respect to the plate and impression cylinders, reference is made more particularly to Figs. 1, 3, 4, 5, and 6, wherein it will be seen that the transverse framework 30 of the machine has mounted therein a series of four longitudinal guides or tracks, 54, 55, 56, and 57, forming therebetween three guideways, one for the rear end of each of the feeder-board arms 23, as shown, the sliding plates 29, carrying the bearings 28 of these feeder-board arms, being adapted to reciprocate therein and being retained in place by having their edges slightly overlapping the edges of said guides or tracks, as shown. It will also be seen that the adjoining parallel faces of the guides or tracks 54 and 55 incline downward toward their front ends, while the adjoining parallel faces of the guides or tracks 55 and 56 are on substantially a horizontal line, and the adjoining parallel faces of the guides or tracks 56 and 57 incline upward toward their front ends. The object of this construction is to provide that the front edges of the feeder-boards shall all arrive at the same point when in their projected position in the proper delivery-plane to the plate and impression cylinders. If desired, however, these guideways may all incline downward or upward, it being only necessary that their angles of delivery shall vary in the proper degree to insure their accurate delivery at the same point when the feeder-boards are in their projected positions.

Fixed to the rear portion of each lower sliding plate 29 of the three sets is a rack-bar 58, each projecting through an aperture 59 in the transverse framework 30 and some distance to the rear thereof and adapted to slide upon the rearward extensions of the guides or tracks 54, 55, 56, and 57, the latter being preferably formed each in a solid piece. Upon the under sides of each of the rearward extensions of the guides or tracks 54, 55, and 56 are also fixed rack-bars 60, located directly over the rack-bars 58. A pinion 61 meshes with each of these pair of rack-bars 58 and 60 and is mounted in bearings in the front ends of arms 62. To the rear ends of these arms 62 are connected the upper bifurcated ends of levers 63, 64, and 65, as clearly shown in Figs. 3 and 6, the lever 63 being thus connected to the rack-bar 58 of feeder-board A, lever 64 with the rack-bar of feeder-board B, and lever 65 with the rack-bar of feeder-board C. These levers are pivoted intermediate their lengths in bearings 66, projecting from the frame of the machine, and carry at their lower ends the stud-rollers 67, 68, and 69, respectively, moving in a continuous cam-groove in the periphery of cam-wheel 22. Referring to said cam-groove, (shown in diagram in Fig. 8, in which the arrow indicates the direction of rotation,) it will be seen that the same consists of two short straight races 70 and 71 and two long straight races 72 and 73, both of them parallel with the races 70 and 71, the races 70 and 71 lying to one side of and the races 72 and 73 to the other side of the center of the periphery of the cam-wheel. These races are connected one to the other by diagonal steps 74, 75, 76, and 77, as shown. The relative lengths of these races and steps are preferably as follows, the circumference of the cam-wheel being divided into eighteen equal divisions: the long races 72 and 73 seven-eighteenths each, the short races 70 and 71 one-eighteenth each, and the diagonal steps 74, 75, 76, and 77 one-thirty-sixth each.

The relative positions of the stud-rollers 67, 68, and 69 are shown in said Fig. 8, they being equidistant from each other and disposed around one-third the circumference of said cam-wheel, and from said figure and the above description it will be understood that two of said stud-rollers are always in either the race 72 or 73 at the same time and at certain intervals all three of them are in said races. In other words, but one of said stud-rollers can be moving in the diagonal steps 74, 75, 76, or 77 or in races 70 or 71 at a time, though at times none of the stud-rollers are in said steps or races. Now by referring to the diagrammatic view of cam-wheel 18, controlling the vibrating movements of the feeder-boards, as shown in Fig. 7, and considering the same in connection with Fig. 8, it being remembered that the two cam-wheels rotate at the same speed, it will be seen that the steps 74, 75, 76, and 77 and the races 70 and 71 are so arranged with respect to the central races 46 and 47 of cam-wheel 18 that when the stud-rollers of the two cam-grooves are located as shown in said figures—that is to say, opposite to each other—the stud-roller 44 will have completed its entry into the central race 46 of cam-wheel 18 just before stud-roller 68 begins its entry into diagonal step 75, and in the same way stud-roller 68 will have passed through race 70 and diagonal step 74 just before stud-roller 44 enters step 50.

Referring to Fig. 3, it will be seen that stud-roller 68 through lever 64 controls the reciprocating movement of feeder-board B, as does stud-roller 44 the vibrating movement of the same feeder-board, so that when stud-roller 44 passes from step 51 into the central race 46 the said feeder-board B will be in the central position, as hereinbefore described. The cam-races 70 and 71 of cam-wheel 22, lying to the outside of the periphery thereof, will therefore rock the lever 64 on its bearing 66, so as to project the upper end of said lever 65 inward, when its stud-roller 68 enters step 75 and race 70 and will again rock the upper end of said lever outward when said stud-roller enters step 74, as will be readily understood. It will also be noticed that this rocking in and out again is begun and completed while the stud-roller 44 is moving in cam-race 46, or, in other words, while the feeder-board B is in the central position, and that as soon as this rocking is completed, which occurs when stud-roller enters race 72, stud-roller 44 will begin to enter step 50, thus beginning the vibrating movement of feeder-board B to the right of the central position. From this description it will be seen that as soon as one of the stud-rollers 44 45 46 has passed through one of the steps 51 or 53 the stud-roller in cam-wheel 22, controlling the reciprocating movement of the same feeder-board, will at once enter one of the diagonal steps 75 or 77 and will pass through race 70 or 71 and out again through step 74 or 76 into one of the long races 72 or 73 before said stud-roller in cam-wheel 18 has passed through its race 46 or 47, or, in other words, before the controlled feeder-board has left the central position. This operation will be repeated successively and indefinitely by the coincident stud-rollers as the cam-wheels 18 and 22 revolve.

Referring now to Figs. 4, 5, and 6, there will be seen a series of three plates 78, one attached to the under side of each of the guides or tracks 54, 55, and 56 a little in front of the transverse framework 30. These plates are rounded at their rear ends on the arc of a circle struck from the centers of the bearings 28 of the feeder-board arms 23 and are slotted centrally at 79 from their rear to almost their front edges, as clearly shown in Fig. 6. A pin 80, projecting from the upper surface of each of the toothed segments 24, 25, and 26, is adapted to travel in the slot 79 of its plate 78 as its feeder-board is projected forward to delivery position and will accurately guide said feeder-board in this forward movement. Moreover, when said feeder-board is vibrated on its bearing 28 to either side said pin 80 by contacting with the rounded rear end of the plate 78 will effectually prevent any accidental forward movement of the feeder-board, so that it will be seen that a feeder-board can only move forward when its pin 80 registers with the slot 79 of its plate 78, or, in other words, when said feeder-board is in the central position.

As will be seen in Figs. 5 and 6, each of the rack-bars 32, 33, and 34 is provided on its under side with a centrally-located tongue or projection 81, the same being slotted centrally at 82, in which slots the rack-bars 58 of the corresponding feeder-boards move. Near the front ends of the rack-bars 58 are transverse slots 83, adapted to register with the tongues 81 when the feeder-boards are in their retracted positions. The slotted tongues 81, embracing the rack-bars 58, will thus prevent any movement of the racks 32, 33, and 34 except when the slots 83 in said rack-bars 58 register with said tongues 81, which will only occur when the feeder-boards are in their retracted positions, and as the tongues 81 are located centrally on the rack-bars 32, 33, and 34 the slots 82 and 83 will only register when the feeder-boards are retracted and in the central position. Thus it will be seen that when in this position while either a reciprocating or a vibrating movement may be imparted to the feeder-boards only one of these movements can be imparted at a time.

Attached to the framework supporting the plate and impression cylinders are two guides 112, each provided with a double cam-surface, as shown, for engaging with suitable projections, hereinafter described, on the sides of the feeder-boards and adapted to accurately adjust the latter both vertically and horizontally to the exact delivery position, as will be readily understood by reference to Figs. 1 and 2.

Referring now to Figs. 9 to 17 of the drawings, I will proceed to describe the construction of the feeder-boards A, B, and C, a description of one of which will suffice for all. In the said figures the reference-numeral 84 denotes the frame of the board, forming the two sides and the rear end thereof. Attached to this frame by screws, rivets, or otherwise is the body of the board. I have here shown this body as formed in two pieces 85 and 86, the front piece 85 being riveted to the frame 84 at its sides and brought down to a knife-edge at its front, while the rear piece 86 is attached at its rear to the frame by screws 87, its front end overlapping the rear end of the front piece 85, as shown in Fig. 11. It will be understood, however, that this body of the board may be formed of a single piece, if desired.

The frame 84 is made L-shaped and has slidably mounted thereon beneath the body of the board the transverse bar 88, running from side to side of the board and having lips 89 formed on its ends, resting on the frame 84 at each side. Two plates 90, one on each side of the board and recessed on their adjacent edges at 91 to overlap the lips 89 of the bar 88, are attached to the frame 84 by screws 92, as shown in Fig. 15. It will readily be seen that by slightly loosening said screws 92 the transverse bar 88 may be adjusted longitudinally of the board and then firmly held in any adjusted position by again tightening said screws. Access is had to these screws 92 through apertures 93 in the body of the feeder-board, as shown in Fig. 9. Mounted in suitable bearings 94 on said bar 88 are the two short transverse shafts 95, one near each end of said bar and each carrying a nut 96, slidable thereon, set-screws 97 serving to retain said nuts in any adjusted position. Pins 98, fixed in said nuts, are adapted to project up through any one of a series of elongated slots 99, formed longitudinally in the body of the board, as shown in Fig. 9. Each of these shafts 95 has a weak spiral spring 100 wound around the same at its inner end and engaged at one end with one of the bearings 94 and at its other end with a nut 101, adjustably mounted on said shaft. These springs serve to normally prevent any forward movement of the pins 98 by the rotation of the shafts 95 in that direction, while suitable pins 102, mounted on said shafts and impinging against the bar 88, as shown in Fig. 16, will limit the rotation of the shafts 95 in that direction.

Mounted on suitable broad bearings 103, carried by plates 104, are the two fingers 105, consisting each of a body portion of resilient material slotted longitudinally and centrally at 106 to provide for its adjustment on its bearing 103, and a transparent or semitransparent end 107, fixed to said body portion. These ends 107 are apertured at 108 to register with the pins 98, but owing to the broad bearings 103 and the resiliency of the body portion of said fingers will normally remain a little distance above and free from said pins until pressed down thereon by the finger of the operator, so that said pins enter the apertures 108. By loosening the screws 109 the said fingers may be readily adjusted on their bearings, while longitudinal slots 110 permit a longitudinal adjustment to the plates 104, carrying said bearings on the frame 84 of the board, as will be readily understood. It will thus be seen that a ready adjustment is permitted to the pins 98 and the fingers 105 within certain prescribed limits.

Attached to each side of the frame of the board near its front end are the wings or projections 111, adapted to contact with the guides 112 on the press-frame, in proximity to the plate and impression cylinders to bring the board to the proper delivery position. These projections will also serve for use where any other form of registering and adjusting device is employed, though, if desired, they may be entirely dispensed with and the boards adjusted by direct contact of their sides with the guides 112.

From the above description the complete operation of the mechanism will be understood to be as follows: The feeder-boards A and C being, as shown in the drawings, at rest to the left and right of the central position, an operator is engaged in front of each one of them in laying on the paper to be printed. This is readily and accurately accomplished in work requiring the most careful registration by first properly adjusting the pins 98 and fingers 105 to their proper positions and then laying the sheet of paper D on the board and adjusting it so that the register-marks on the paper will come under the apertures 108 of the fingers 105 in the proper position, when by pressing down the fingers 105 the paper will be impaled by the pins 98 and firmly held in its adjusted position, the fingers 105 resuming their normal position as soon as the pressure is removed therefrom. Now when the board is swung into delivery position and the projecting front edge of the paper D is seized between the rotating plate and impression cylinders of the press the pull exerted on the paper will rock the shafts 95 against the tension of the weak springs 100, and thus as the pins 98 rotate thereon in a forward direction, as shown in Fig. 14, the paper will be released therefrom and will feed into the press, the pins 98 and their shafts 95 at once resuming their normal positions. In order to provide for an accurate adjustment of said pins transversely, a suitable scale may be provided on the bar 88, as shown in Fig. 16. While this laying on and feeding of the paper is going on the following is the operation of my improved mechanism for operating the feeder-boards: As shown in Figs. 1 and 2, the feeder-board B lies projected forward centrally in the delivery position, the stud-rollers 44 and 68, controlling said board, lying in the races 46 and 70 of the cam-wheels 18 and 22, respectively, while the feeder-boards A and C lie retracted to the left and right, respectively, of the central position, their stud-rollers 43 67 and 45 69, respectively, lying in the races 49 and 73 of the cam-wheels 18 and 22. Now as the cam-wheels 18 and 22 are rotated at the same speed in the direction of the arrows in Figs. 7 and 8 the stud-roller 68 of lever 64, controlling feeder-board B, will enter step 74 of cam-wheel 22, thus rocking the upper end of said lever 64 rearwardly, which, through the arms 62, retracts pinion 61 the same distance. The toothed engagement of said pinion with the fixed rack 60, however, rotates said pinion reversely to its direction of longitudinal movement, and thus by the toothed engagement of said pinion on its under side with the rack-bar 58 imparts a rearward movement to said rack-bar 58 and through it to the feeder-board B equal to twice the movement of the upper end of lever 65, thereby retracting said feeder-board from its forward or delivery position to its rearward position, so that the slots 82 and 83 in the tongue 81 and rack-bar 58, respectively, will register. This movement is completed when the stud-roller 68 reaches the end of step 74 in cam-wheel 22, at which time stud-roller 44, controlling the vibrating movement of said feeder-board B, reaches step 50 in cam-wheel 18. As this stud-roller 44 enters said step the feeder-board B is vibrated to the right through lever 37, operating rack 33, which in turn operates the toothed segment 25 of said feeder-board B. The rotation of the cam-wheels 18 and 22 has, however, brought stud-roller 45, controlling feeder-board C, through lever 38 and rack-bar 34 into step 51 at the same time that stud-roller 44 reached step 50, so that feeder-board C is moved into central position as feeder-board B is moved to the right. Upon the completion of this movement of stud-roller 45 in step 51 stud-roller 69, controlling the lever 64 of feeder-board C, will enter step 75, thus projecting the feeder-board C to the delivery position. In the same manner feeder-board C will be retracted through step 74 and then through step 50, swung to the left, the feeder-board A swinging to the central position. This operation will be continued indefinitely, each feeder-board remaining alternately at rest to one side or the other of the central position and being in turn swung to said central position, projected to delivery position, retracted, and finally swung to the other side, each feeder-board delivering twice to the press during one rotation of the cam-wheels 18 and 22.

The cam-wheels 18 and 22 being geared to rotate once to six rotations of the plate and impression cylinders 3 and 4, as hereinbefore described, it will be understood that a complete rotation of said plate and impression cylinders takes place while the cam-wheels 18 and 22 are traveling a distance equal to three of the eighteen spaces marked thereon in Figs. 7 and 8 and that the time occupied by one of the stud-rollers 68, 69, or 70 in traversing either of the races 70 or 71, which is equal to the time a feeder-board lies at rest in the projected delivery position, is equal to the time occupied by the plate and impression cylinders in making one-third of a complete rotation. Now if the printing-plate be so arranged on the plate-cylinder 3 that its front edge will pass beneath the impression-cylinder 4 approximately as a feeder-board reaches its projected delivery position it will readily be seen that ample time is given for the complete delivery of the paper from said feeder-board.

As in my application for Letters Patent hereinbefore referred to the press may be run at the rate of twenty or more impressions a minute, the two operators engaged in laying on the paper being given a length of time equal to that occupied by two deliveries within which to lay on and adjust each sheet. Moreover, while I have illustrated in the present construction a series of three feeder-boards it will be understood that I do not limit the scope of my invention to this number, as they may be increased, if desired, by making the necessary changes in the operating mechanism; nor do I wish to be understood as limiting myself to the particular form of paper-retaining device for the feeder-boards, as the same may be varied or even dispensed with and an entirely different mechanism substituted. Furthermore, this particular paper-retaining mechanism may be employed in presses of any other type, if so desired.

It will also be apparent that this general construction may be employed in devices analogous to printing-presses—that is to say, devices in which a rapid feed is a desideratum—and I do not, therefore, limit myself to its application to printing-presses.

Having thus fully described my invention, what I claim, and desire to secure by Letters Patent, is—

1. In a feeding device, the combination of a feeder adapted to move transversely across the path of the line of feed and to reciprocate into and away from the delivery position, said movements being in substantially the same plane, substantially as shown and described.

2. In a feeding device, the combination of a series of independently-movable feeders adapted to move transversely across the path of the line of feed and to reciprocate into and away from the delivery position, substantially as shown and described.

3. In a feeding device, the combination of a series of independently-movable feeders adapted to vibrate transversely across the path of the line of feed and to reciprocate into and away from the delivery position, substantially as shown and described.

4. In a feeding device, the combination of a series of independently-movable feeders adapted to move transversely across the path of the line of feed and to reciprocate into and away from the delivery position, and means whereby but one of these movements at a time is permitted to each feeder, substantially as shown and described.

5. A printing-press provided with a series of feeder-boards adapted to move transversely across the path of the line of feed to the press and to reciprocate into and away from the delivery position, substantially as shown and described.

6. A printing-press provided with a series of feeder-boards adapted to vibrate across the path of the line of feed to the press and to reciprocate into and away from the delivery position, substantially as shown and described.

7. A printing-press provided with a series of feeder-boards adapted to have an independent movement transversely across the path of the line of feed to the press, and to reciprocate into and away from the delivery position, substantially as shown and described.

8. A printing-press provided with a series of feeder-boards adapted to have an independent movement transversely across the path of the line of feed to the press, and to reciprocate independently into and away from the delivery position, substantially as shown and described.

9. A printing-press provided with a series of feeder-boards adapted to move transversely across the path of the line of feed to the press and to reciprocate into and away from the delivery position, said movements being in substantially the same plane and means whereby but one of these movements at a time is permitted to each feeder, substantially as shown and described.

10. In a printing-press, the combination of a series of vibrating and reciprocating feeder-boards having their bearings mounted one above the other, and means for presenting the front ends of said feeder-boards successively to a single delivery-point, substantially as shown and described.

11. In a printing-press, the combination with a series of feeders adapted to deliver successively to said press, of cam-wheels adapted to impart to said feeders a transverse movement across the path of the line of feed to the press and a reciprocating movement into and away from the delivery position, substantially as shown and described.

12. In a printing-press, the combination with a series of feeders adapted to deliver successively to said press, of cam-wheels adapted to impart to said feeders an independent transverse movement across the path of the line of feed to the press, and an independent reciprocating movement into and away from the delivery position, substantially as shown and described.

13. In a printing-press, the combination with a series of feeder-boards, of a cam-wheel, levers connecting said cam-wheel with the feeder-boards whereby a reciprocating movement into and away from the delivery position is imparted to the latter from said cam-wheel, and intermediate mechanism between said levers and feeder-boards for imparting a longer reciprocation to the said feeder-boards than is given to said levers, substantially as shown and described.

14. In a printing-press, the combination with a series of feeder-boards adapted to reciprocate into and away from the delivery position, racks carried by said feeder-boards, racks fixed to the press-frame, a pinion for each feeder-board meshing with one of said feeder-board racks and one of the fixed racks, a rotating cam-wheel, and intermediate pivoted levers connected to said pinions and having their other ends engaged by said cam-wheel, all operating to impart a longer reciprocating movement to the feeder-boards than is imparted to said levers from the cam-wheel, substantially as shown and described.

15. In a printing-press, the combination with a series of feeder-boards adapted to deliver successively to said press, of cam-wheels operated by the press mechanism and having differently-disposed races in their peripheries, and levers connecting said cam-wheels with the feeder-boards, all operating to impart to said feeder-boards an alternate vibrating movement and a reciprocating movement with respect to the line of feed to the press, substantially as shown and described.

16. In a printing-press, the combination with a series of feeder-boards, of a series of guideways in which said feeder-boards are mounted, said guideways converging toward their front ends, and means for reciprocating said feeder-boards in said guideways, the whole operating to bring said feeder-boards to the same delivery-point when in their projected position, substantially as shown and described.

17. In a printing-press, the combination with a series of feeder-boards, arms fixed to said feeder-boards and projecting rearwardly therefrom, bearings on which said arms are mounted intermediate their length, and guideways in which said bearings are mounted, of cam-wheels and intermediate mechanism whereby an alternate and independent bodily reciprocating movement and a vibrating movement on said bearings are imparted to said arms and attached feeder-boards, substantially as shown and described.

18. In a printing-press, the combination with a series of feeder-boards, and means for reciprocating the same into and away from the delivery position, of guides fixed to the press-frame in proximity to the delivery position and adapted to engage with the sides of the feeder-boards as the latter approach the delivery position to adjust the same both vertically and horizontally to the exact delivery position, substantially as shown and described.

19. In a printing-press, the combination with a series of feeder-boards having wings or projections fixed to the sides thereof near their front ends, and means for reciprocating said boards into and away from the delivery position, of guides fixed to the press-frame in proximity to the delivery position and adapted to engage with the wings or projections on the feeder-boards as the latter approach the delivery position to adjust the same both vertically and horizontally to the exact delivery position, substantially as shown and described.

20. In a feeder-board for printing-presses, the combination with the body of the board having a series of longitudinal slots thereon, of a cross-bar extending transversely of the board beneath the body of the same and adjustable longitudinally of the same, transverse shafts pivoted in bearings on said cross-bar beneath said slots, nuts carried by said shafts and adjustable longitudinally thereon, pin-points mounted in said nuts and adapted to normally project through the slots in the body of the board, springs engaged with said shafts and their bearings to exert a normal tension on the shafts in one direction, and stops on said shafts for limiting the rotation of the same in that direction, substantially as shown and described.

21. In a feeder-board for printing-presses, the combination with pin-points projecting through the body thereof, of resilient fingers mounted on the sides of the board and having apertures registering with said pin-points and adapted by manual pressure to force the paper, when passed therebetween, into engagement with said pin-points and to spring back to their normal position when pressure is removed therefrom, substantially as shown and described.

22. In a feeder-board for printing-presses, the combination with adjustable pin-points projecting through the body thereof, of adjustable resilient fingers mounted on the sides of the board and having apertures adapted to register with said pin-points and adapted by manual pressure to force the paper, when passed therebetween, into engagement with said pin-points and to spring back to their normal position when pressure is removed therefrom substantially as shown and described.

23. In a feeder-board for printing-presses, the combination with adjustable pin-points projecting through the body thereof, of fingers mounted on longitudinal adjustable bearings on the sides of the board and centrally slotted longitudinally to provide adjustable connections with their said bearings, the said fingers formed at their outer ends of transparent or semitransparent material having apertures therein adapted to register with the pin-points, substantially as shown and described.

24. In a feeding device, the combination of a feeder adapted to move transversely across the path of the line of feed and to reciprocate into and away from the delivery position, said movements being in substantially the same plane, and means whereby but one of these movements at a time is permitted to said feeder, substantially as shown and described.

25. In a feeding device, the combination of a feeder adapted to move transversely across the path of the line of feed and to reciprocate into and away from the delivery position, said movements being in substantially the same plane, and means whereby the same, while in its reciprocating movement, is automatically locked against its transverse movement, substantially as shown and described.

26. In a feeding device, the combination of a feeder adapted to move transversely across the path of the line of feed and to reciprocate into and away from the delivery position, said movements being in substantially the same plane, and means whereby the same, while in its transverse movement, is automatically locked against its reciprocating movement, substantially as shown and described.

In testimony whereof I affix my signature in presence of two witnesses.

JUDAH TOURO ROBERTSON.

Witnesses:
LOUIS B. GREGORY,
F. R. MYERS.